United States Patent
Gualco (10) Patent No.: US 11,742,788 B2
(45) Date of Patent: Aug. 29, 2023

(54) PULSE WIDTH-MODULATED DRIVING METHOD FOR AN ELECTRIC MOTOR WITH ZERO-CROSSING COMPENSATION

(71) Applicant: ETEL S.A., Motiers (CH)

(72) Inventor: Gabriele Gualco, Sassel (CH)

(73) Assignee: ETEL S.A., Motiers (CH)

( * ) Notice: Subject to any disclaimer, the term of this patent is extended or adjusted under 35 U.S.C. 154(b) by 0 days.

(21) Appl. No.: 17/852,388

(22) Filed: Jun. 29, 2022

(65) Prior Publication Data
US 2023/0020777 A1 Jan. 19, 2023

(30) Foreign Application Priority Data
Jul. 14, 2021 (EP) .................................... 21185490

(51) Int. Cl.
- H02P 27/08 (2006.01)
- H02M 7/5387 (2007.01)
- H02M 7/5395 (2006.01)

(52) U.S. Cl.
CPC ........ *H02P 27/085* (2013.01); *H02M 7/5395* (2013.01); *H02M 7/53871* (2013.01)

(58) Field of Classification Search
CPC .. H02P 27/08; H02P 27/085; H02M 7/53871; H02M 7/5395
See application file for complete search history.

(56) References Cited

U.S. PATENT DOCUMENTS

| 5,450,306 A | 9/1995 | Garces et al. | |
| 5,506,486 A * | 4/1996 | Hayashi | F04C 18/3564 318/811 |
| 5,811,949 A * | 9/1998 | Garces | H02M 7/53875 318/811 |
| 5,917,721 A * | 6/1999 | Kerkman | H02M 7/53875 363/41 |

(Continued)

FOREIGN PATENT DOCUMENTS

| KR | 20040057202 A | 7/2004 |
| WO | WO9414233 A1 | 6/1994 |

OTHER PUBLICATIONS

Lazhar Ben-Brahim, "On the Compensation of Dead Time and Zero-Current Crossing for a PWM-Inverter-Controlled AC Servo Drive", IEEE Transactions on Industrial Electronics, Oct. 2004, pp. 1113-1117, vol. 51, No. 5, Institute of Electrical and Electronics Engineers, New York, USA.

*Primary Examiner* — Rina I Duda
(74) *Attorney, Agent, or Firm* — LEYDIG, VOIT & MAYER LTD.

(57) ABSTRACT

A pulse width-modulated (PWM) driving method is provided for a PWM motor control system with zero-crossing compensation. The PWM driving method includes controlling each carrier generator of first, second and third PWM generators to generate a carrier offset between each of first, second and third carrier signals, at least when a current flowing in a respective phase of an alternating current (AC) motor of the PWM motor control system is between +/−10

(Continued)

mA, such that a voltage between respective nodes and a reference point of respective half-bridges of the PWM motor control system are offset to obtain a variable common mode voltage each time respective PWM signals are in an off-state, at least when the respective current is crossing zero.

13 Claims, 6 Drawing Sheets

(56) References Cited

U.S. PATENT DOCUMENTS

| | | | |
|---|---|---|---|
| 7,692,465 B2 * | 4/2010 | Mottier ................ | H03K 7/08 327/175 |
| 8,508,310 B2 * | 8/2013 | Froidevaux ........... | H02M 3/157 363/19 |
| 2004/0037097 A1 | 2/2004 | Deng et al. | |

* cited by examiner

Standard PWM       Modified PWM

Fig. 3a $I_1 < 0$

Standard PWM       Modified PWM

PULSE WIDTH-MODULATED DRIVING METHOD FOR AN ELECTRIC MOTOR WITH ZERO-CROSSING COMPENSATION

CROSS REFERENCE TO RELATED APPLICATIONS

This application claims benefit to European Patent Application No. EP 21185490.6, filed on Jul. 14, 2021, which is hereby incorporated by reference herein.

FIELD

The present invention relates a pulse width-modulated (PWM) driving method for driving an electric motor with zero-crossing compensation to reduce the unwanted current-wave distortion of the driving current of the motor. The disclosed method may further comprise deadtime compensation to further reduce the current-wave distortion.

BACKGROUND

In PWM-inverter-controlled AC motor drives, deadtime or time delay must be inserted in switching signals to prevent a short circuit in each of the inverter half-bridges. Although this time delay guarantees safe operation of the inverter, it causes substantial distortion in the output voltages. It results in a momentary loss of control, and the output voltage deviates from the reference voltage. Since this is repeated for every switching operation, its effect may become significant. This effect is still apparent even with the fast-switching devices such as metal-oxide-semiconductor field-effect transistors (MOSFETs), insulated gate bipolar transistors (IGBTs), and others. There is therefore a need for efficient deadtime compensation for the improvement of the performance of PWM inverters in order to avoid or at least reduce the undesirable speed ripple and limit cycle oscillations around a desired position of the motor. Several approaches have been developed for deadtime compensation in order to reduce the unwanted current-wave distortion of the driving current of the motor.

As an example, US 2004/0037097 discloses a method for compensating deadtime non-linearity in a solid switch device comprising the following steps: receiving a PWM signal at a first time point; receiving a current feedback from an output of the solid switch device, wherein the solid switch device comprises a plurality of switch components; detecting a polarity change in the feedback current at a second time point; detecting a rising edge of the PWM signal at a third time point; determining whether the feedback current has a positive or a negative polarity subsequent to the detected polarity change; and if the feedback current has a positive polarity subsequent to the detected polarity change, outputting a first control signal to activate a first switch component of the solid switch device at a predetermined delay after the third time point.

Although US 2004/0037097 acknowledges that due to the deadtime effect, the voltage distortion becomes more severe at the point of current polarity change, more commonly known as "zero crossing", the negative effect of zero crossing is not addressed albeit it contributes, as the deadtime effect, to the current-wave distortion.

L. Ben-Brahim, "On the Compensation of Dead Time and Zero-Current Crossing for a PWM-Inverter-Controlled AC Servo Drive," IEEE Transaction on industrial electronics Vol. 51, No. 5 (October 2004) proposed a method of zero-crossing and dead-time compensation based on angle domain repetitive control.

SUMMARY

In an embodiment, the present invention provides a pulse width-modulated (PWM) driving method for a PWM motor control system with zero-crossing compensation. The PWM motor control system comprises a three-phase alternating current (AC) motor, a power inverter comprising a first, a second and a third half-bridge, each half-bridge comprising a first transistor connected to a common given voltage and a second transistor connected to a reference point, each phase of the AC motor being connected to respective nodes of a corresponding half-bridge, and a controller comprising a first, a second and a third PWM generator comprising a first, a second and a third carrier generator respectively configured to generate a first, a second and a third carrier signal respectively for generating a first, a second and a third PWM signal, each PWM generator further comprising a deadtime generator configured to transform the respective PWM signal into a first and a second inverted square wave signal with deadtimes to control respectively the first and second transistors of the respective half-bridges. The method comprising controlling each carrier generator of the respective first, second and third PWM generators to generate a carrier offset between each of the first, second and third carrier signals, at least when a current flowing in the respective phase of the AC motor is between +/−10 mA, such that a voltage between the respective nodes and the reference point of the respective half-bridges are offset to obtain a variable common mode voltage each time the respective PWM signals are in an off-state, at least when the respective current is crossing zero.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following:

FIG. 5b shows the node voltage of respective half-bridge when offsetting the three carrier signals as shown in FIG. 5a;

DETAILED DESCRIPTION

In an embodiment, the present invention provides an alternative PWM driving method for driving an electric motor with zero-crossing time compensation. In the same or another embodiment, the present invention provides a PWM driving method which further compensate the deadtime negative effect.

These improvements are achieved according to an embodiment of the present invention by means of a PWM driving method for a PWM motor control system with zero-crossing compensation. The PWM motor control system comprises: a three-phase AC motor, a power inverter comprising three half-bridges, wherein each half-bridge comprises a first transistor connected to a common given voltage a second transistor connected to a reference point, each phase load of the AC motor being connected to respective node of the corresponding half-bridge, and a controller. The controller comprises three PWM generators having respectively a first, a second and a third carrier generator configured to generate a first, a second and a third carrier signal respectively for generating a first, a second and a third PWM signal. Each PWM generator further comprises a deadtime generator configured to transform each PWM signal into a first and a second inverted square wave control signal with deadtimes to control respectively said first and second transistors of respective half-bridges.

The method according to an embodiment comprises controlling each carrier generator of respective first, second and third PWM generators to generate a carrier offset between each of said first, second and third carrier signals, at least when the current flowing in respective phase of the AC motor is between −10 mA and +10 mA, such that the voltage between the node and the reference point of the respective half-bridges are offset to obtain a variable common mode voltage each time the respective PWM signals are in an off-state, at least when said current is crossing zero.

The term "offset" within the context of the present disclosure should be understood as a delay in time. The term "when the current is crossing zero" within the context of the present disclosure should be understood as when the current is between +/−10 mA.

In an embodiment, the carrier offset is generated at all times when the motor is operating.

In an embodiment, the carrier offset is constant between each of the three carrier signals.

In an embodiment, the carrier offset is between 0.4 and 8 µs, preferably around 2 µs.

In an embodiment, the frequency of each carrier signal is between 5 kHz and 200 kHz, preferably around 20 kHz.

In an embodiment, the variable common mode voltage is a staircase-shaped ramp voltage.

In an embodiment, the staircase-shaped ramp voltage comprises a negative ramp slope and a positive ramp slope.

In an embodiment, the PWM driving method further comprises the step of determining the current sign of the current for each phase load of the three-phase AC motor. A first and a second square wave control signals to control respectively the first and second transistors of respective first, second and third half-bridges are computed as follows:

When the current sign of the current in respective phase load of the three-phase AC motor is positive, the falling and rising edges of the first control signal are each offset by a first deadtime with respect to the corresponding falling and rising edges of the corresponding PWM signal to control the first transistor of respective first, second and third half-bridges. The rising edges of the second control signal are offset by a second deadtime, with respect to corresponding falling edges of the corresponding PWM signal. The second deadtime is longer than the first deadtime, preferably two times longer. The falling edges of the second control signal are not offset, with respect to the corresponding rising edges of the corresponding PWM signal, in order to control the second transistor of respective first, second and third half-bridges.

When the current sign of the current in respective phase load of the three-phase AC motor is negative, the falling edges of the first control signal is not offset with respect to the corresponding falling edges of the corresponding PWM signal, and the rising edges of the first control signal are offset, with respect to the corresponding rising edges of the corresponding PWM signal, by the second deadtime. The rising and falling edges of the second control signal are each offset, with respect to the corresponding falling edges and rising edges of the corresponding PWM signal, by the first deadtime which shorter than the second deadtime, preferably two times shorter.

In an embodiment, when the current sign of the current in respective phase load of the three-phase AC motor is negative, the second control signal, to control the second transistor of respective half-bridges, is an inverted delayed replica of first, second and third PWM signals respectively. And when the current sign of the current in respective phase load of the three-phase AC motor is positive, the first control signal, to control the first transistor of respective half-bridges, is a delayed replica of first, second and third PWM signals respectively.

In an embodiment, the node voltage of respective half-bridges of the power inverter is a delayed replica of first, second and third PWM signals respectively when the current sign of the current in respective phase load of the three-phase AC motor is positive or negative.

Figure 1:
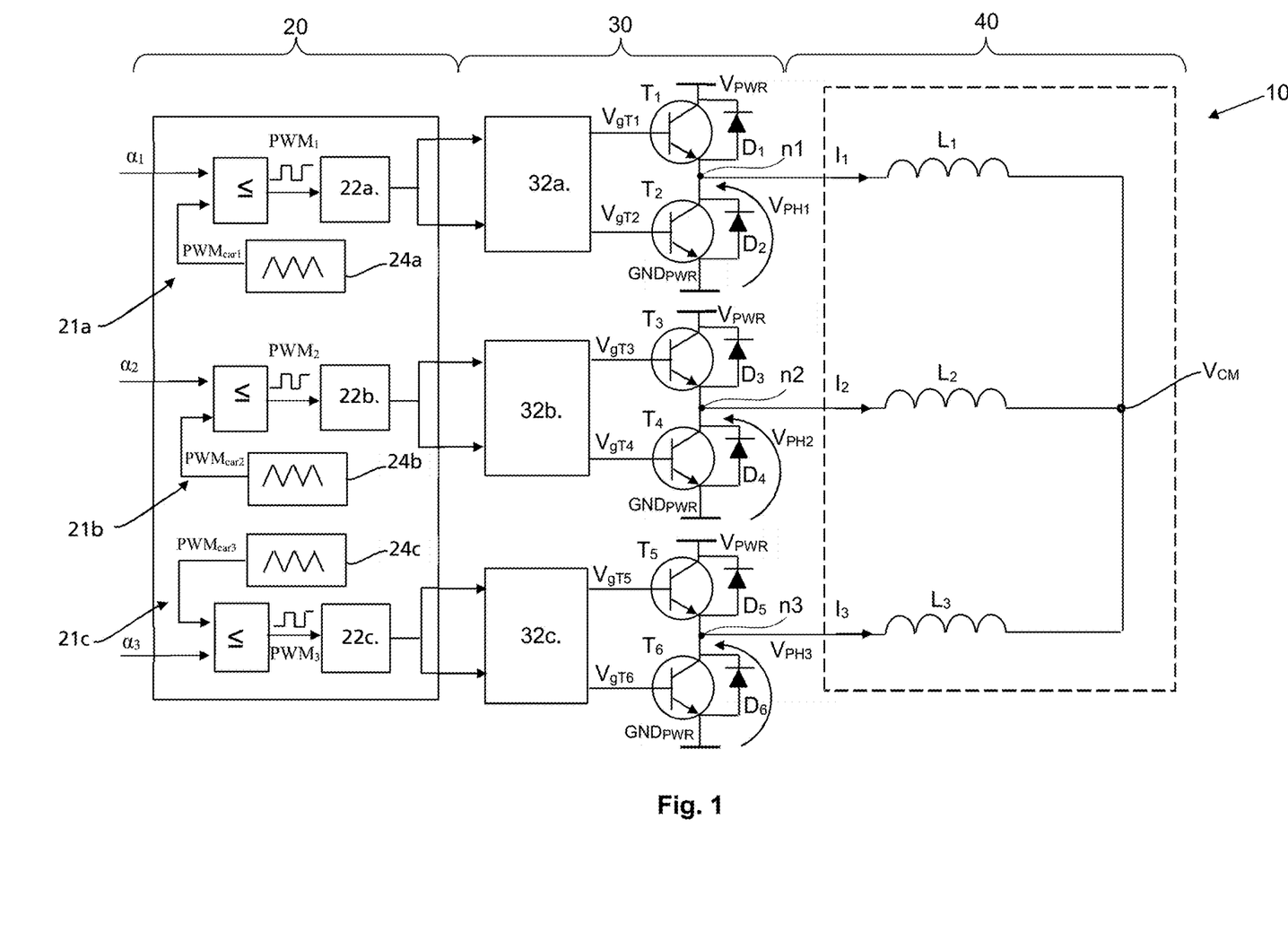
FIG. 1 shows a partial schematic view of a PWM motor control system of an exemplary embodiment of the invention.

A PWM motor control system 10 is shown in FIG. 1. The PWM motor control system comprises a controller 20 which may be for example a field-programmable gate array (FPGA) controller, a power inverter 30 and a three-phase AC motor 40. The controller 20 comprises a PWM generator and a dead-time generator for driving each phase load of the three-phase AC motor 40. The controller 20 is configured and connected to develop the necessary voltage out of the power inverter 30 such that, when applied to the motor 40, the desired current and torque are generated. Because these voltages are related to the position and speed of the motor, the position and speed of the rotor are determined. A rotor position encoder (not shown) is connected to the motor 40 to detect the position of the rotor. The signal of the position encoder is fed-back to the control to adapt the PWM signal as required.

The power inverter 30 comprises three half-bridges comprising each a first transistor $T_1$; $T_3$; $T_5$ connected to a common given voltage, which may be for example a positive bus voltage, and a second transistor $T_2$, $T_4$, $T_6$ connected to a reference point, which may be the ground. The reference point of each half-bridge may be connected together to a negative bus voltage according to an alternative embodiment. The gates of both the first and second transistors $T_1$, $T_2$; $T_3$, $T_4$; $T_5$, $T_6$ of respective half-bridge of the power inverter 30 are driven by a first, a second and a third gate driver 32a, 32b, 32c of the power inverter 30.

The controller 20 comprises three PWM generators 21a, 21b, 21c and three dead-time generators 22a, 22b, 22c, i.e. one generator and one dead-time generator per phase load. Each PWM generator comprises a carrier generator 24a, 24b, 24c configured to generate a carrier signal $PWM_{car1}$, $PWM_{car2}$, $PWM_{car3}$ which is fed into a comparator together with a reference signal $\alpha_1$, $\alpha_2$, $\alpha_3$ to output from a comparator a PWM signal $PWM_1$, $PWM_2$, $PWM_3$. The reference signals $\alpha_1$, $\alpha_2$, $\alpha_3$ are typically sinusoidal waveforms computed by a processor (not shown) to control the motor speed and torque. The reference signals $\alpha_1$, $\alpha_2$, $\alpha_3$ must be shifted by 120° from each other to control each phase load of the three-phase motor 40 adequately.

Figure 3A:
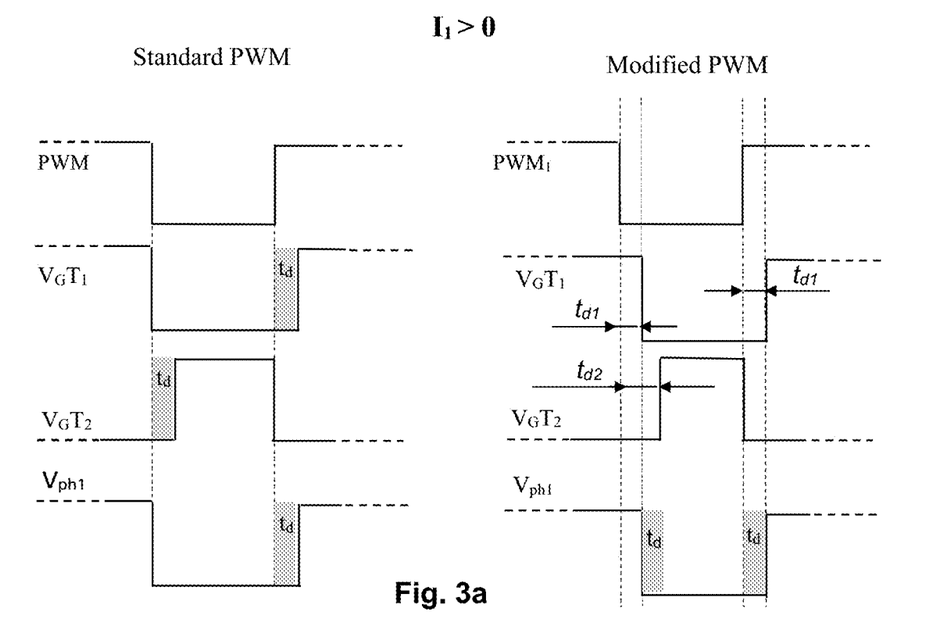
FIG. 3a shows a PWM signal with deadtimes according to the prior art versus a modified PWM signal with deadtime compensation according to an exemplary embodiment of the invention when the polarity of the current in one phase load of the motor is positive.
Figure 3B:
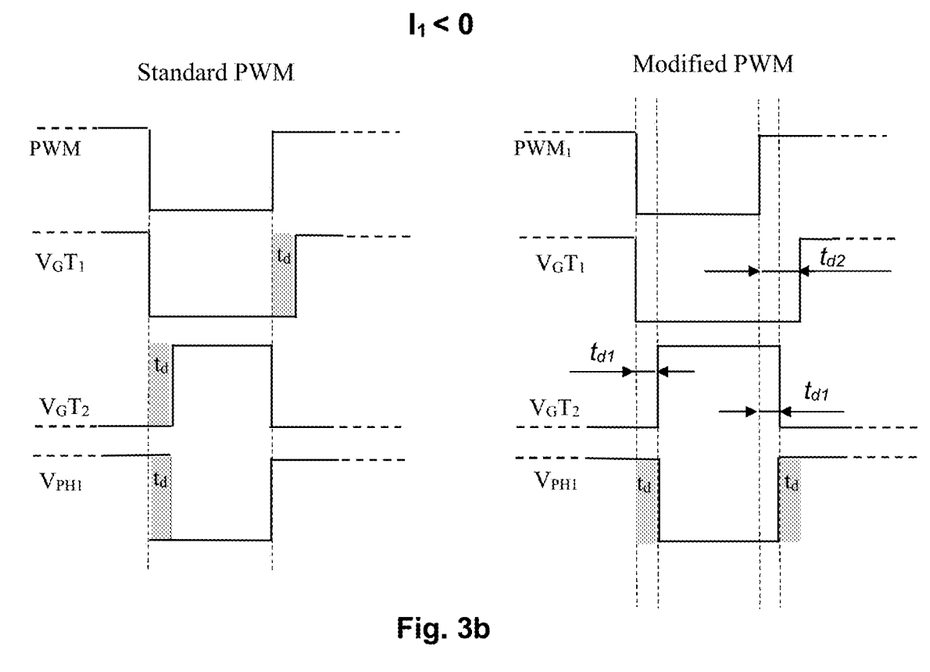
FIG. 3b shows a PWM signal with deadtimes according to the prior art versus a modified PWM signal with deadtime compensation according to an exemplary embodiment of the invention when the polarity of the current in one phase load of the motor is negative.

The deadtime generators 22a, 22b, 22c are configured to transform the corresponding PWM signal $PWM_1$, $PWM_2$, $PWM_3$ into a first and a second inverted square wave control signal with deadtimes $t_{d1}$, $t_{d2}$ as depicted in FIGS. 3a, 3b. The magnitude of the first and second control signals is increased by respective gate drivers 32a, 32b, 32c of the power inverter 30 in order to control respectively the first and second transistors $T_1$, $T_2$; $T_3$, $T_4$; $T_5$, $T_6$ of each of the three half-bridges.

As previously mentioned, the deadtime generator is essential to ensure a period during a switching transition when both output of the two transistors of each half-bridge are driven into a cut-off mode and both are "off" to avoid any short-circuit through the half-bridges of the inverter. The deadtime may be for example between 100 ns and 2 μs, preferably around 500 ns, and should be determined based on the selected transistor type.

Figure 2:
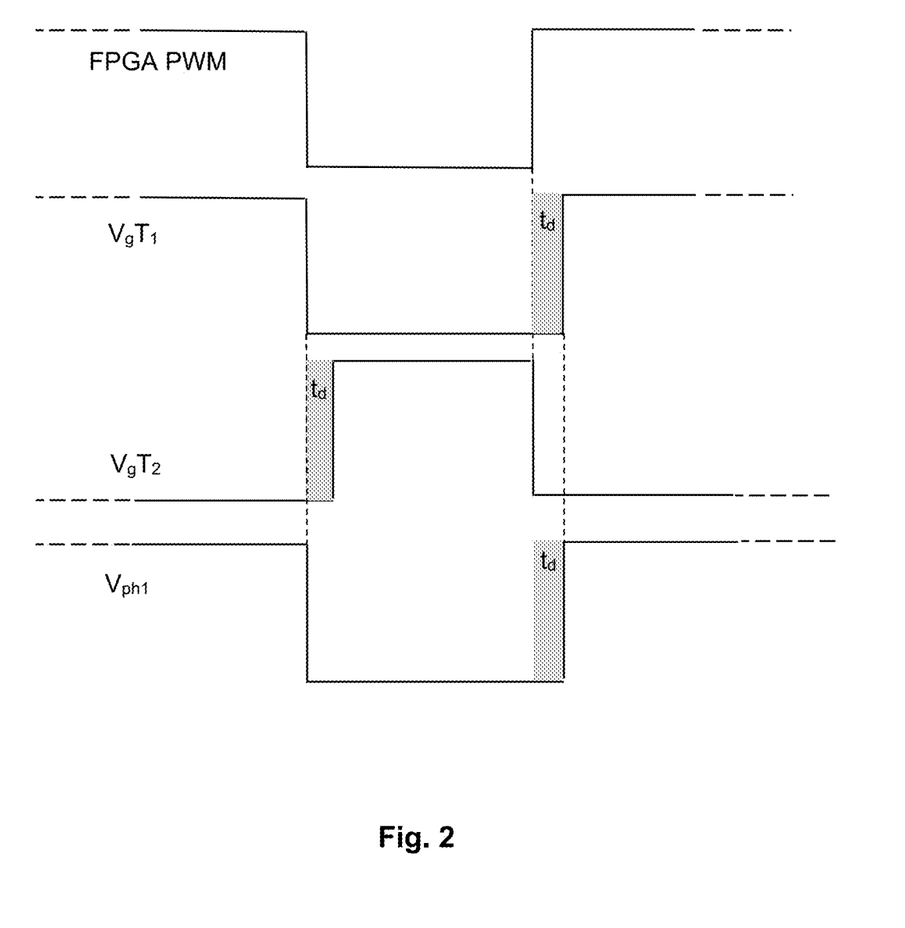
FIG. 2 shows a PWM signal with the insertion of deadtimes in the PWM signal to prevent a short circuit in one-phase leg of a PWM inverter according to the prior art.

As shown in FIG. 2, during the deadtime $t_d$ shown in grey of a conventional PWM signals to drive alternatively transistors $T_1$ and $T_2$ of one half-bridge to control one phase load of the motor 40, the node output voltage is determined by the current sign and hence, by the diode that is driven on by the load current.

In order to address the voltage losses and to linearize the signals at the outputs of the power inverter 30, the controller 20 modifies the conventional PWM scheme to compensate the deadtime negative effect as per the following modified PWM scheme. The current sign of the currents $I_1$, $I_2$, $I_3$ flowing in respective load phase is first determined, and the PWM scheme is modified accordingly as shown in FIGS. 3a and 3b according to an embodiment. The currents $I_1$, $I_2$, $I_3$ are typically measured using current sensors inserted between the inverter nodes and the motor phase loads.

Referring to FIG. 3a, when the polarity of the current in the respective load phase is positive, the on-time of the first transistor $T_1$; $T_3$; $T_5$ of each half-bridge controlling the corresponding phase of the three-phase AC motor 40 is increased. This is achieved by delaying the falling and rising edges of respective $PWM_1$, $PWM_2$, $PWM_3$ signals (FIG. 1) by a first deadtime $t_{d1}$ such that the first control signal $V_{gT1}$ applied to the gate of the first transistor $T_1$ is a replica of the $PWM_1$ signal with rising edges and falling edges delayed with respect to corresponding rising edges and falling edges of the $PWM_1$ signal by the first deadtime $t_{d1}$, which may last for example 500 ns. The rising edges of the second control signal $V_{gT2}$ is delayed with respect to the corresponding rising edges of the $PWM_1$ signal by a second deadtime $t_{d2}$ whose length may be for example twice the length of the first deadtime $t_{d1}$, which may last for example 1 μs, while the falling edges of the second control signal are not offset with respect to the corresponding rising edges of the $PWM_1$ signal.

Referring to FIG. 3a, when the polarity of the current $I_1$, $I_2$, $I_3$ in the respective load phase is negative, the falling edges of the first control signal $V_{gT1}$ is not offset with respect to the corresponding falling edges of the $PWM_1$ signal and the rising edges of said first control signal are offset by the second deadtime $t_{d2}$ with respect to the corresponding rising edges of the $PWM_1$ signal. The rising and falling edges of the second control signal $V_{gT2}$ are each offset with respect to the corresponding falling and rising edges of the $PWM_1$ signal by the first dead-time $t_{d1}$, which is shorter than said second deadtime $t_{d2}$, preferably two times shorter.

Controlling the gate of each transistor as described above ensures that the node voltage Vol as shown in FIGS. 3a and 3b is always a delayed replica of the $PWM_1$ signal. Signals $PWM_2$ and $PWM_3$ are controlled individually, but the voltage waveforms applied to the gate of transistors $T_3$ and $T_4$ of the second half-bridge and to the gate of transistors $T_5$ and $T_6$ of the third half-bridge are similar to the voltage waveforms $V_{gT1}$ and $V_{gT2}$ applied to the first and second transistors $T_1$, $T_2$ of the first half-bridge for positive and negative currents as depicted in FIGS. 3a and 3b. These driving waveforms significantly reduce non-linearity between the PWM duty-cycle input and the obtained voltage output.

As already mentioned, voltage distortion also occurs at the point of polarity change, more commonly referred to as zero crossing. When the current is crossing zero, during dead-time $t_d$, the freewheeling diodes D1-D6 cannot turn on. In this situation, the output node of the half-bridge is floating and its voltage is determined by design parasitic. It becomes problematic when the motor is at standstill and all the phases are pulsing following the PWM with 50% duty cycle. Since the PWM motor system 10 is balanced, the common mode voltage $V_{cm}$ will always have the same waveform as the load phase voltages $V_{ph1}$, $V_{ph2}$, $V_{ph3}$.

Figure 4A:
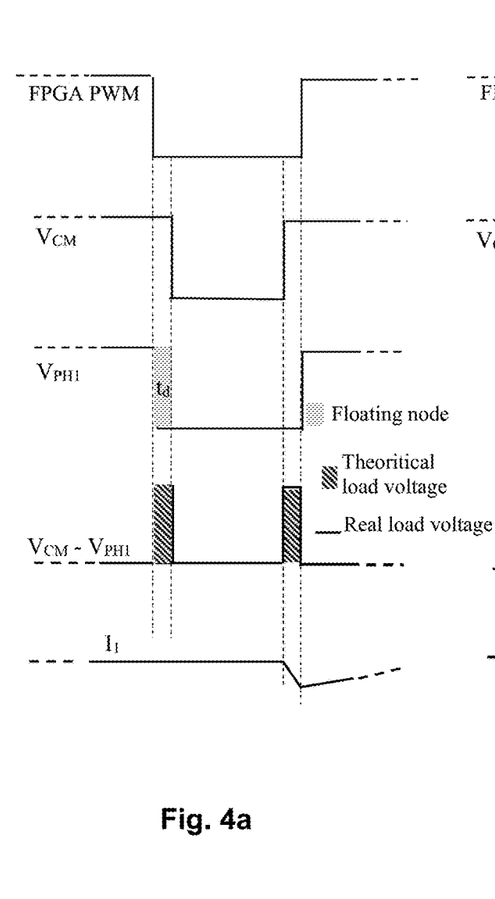
FIG. 4a shows a period of the PWM signal, and the corresponding common mode voltage, the node voltage of one half-bridge of the power inverter, the voltage across one phase load and the resulting current in that phase for a scenario in which the conventional PWM scheme of FIG. 2.

In this situation, no voltage can be applied as shown in FIG. 4a. The current $I_1$ being zero, the output node is floating during the deadtime $t_d$ which causes the output current $I_1$ to remain at zero current until the second pulse is generated. However, since the second pulse is still small in time, the magnitude of the current generated during the second pulse is not sufficient to bring the current at the next transition and the problem repeats again.

Figure 5A:
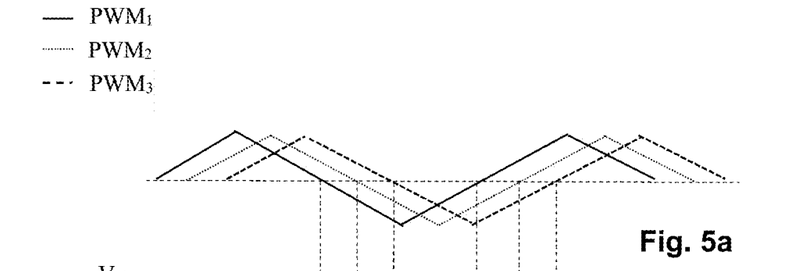
FIG. 5a shows three carrier signals of respective PWM generators offset from each other by a constant offset according to an embodiment of the invention.
Figure 5B:
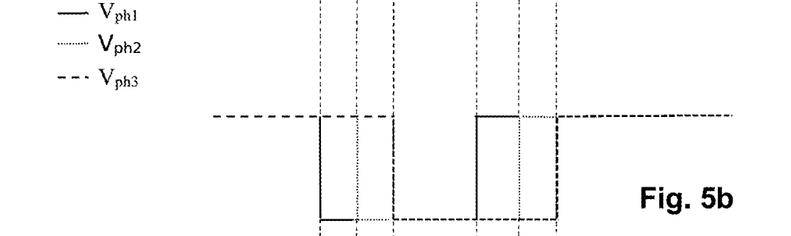

In order to overcome this problem, each carrier generator 24a, 24b, 24c of respective first, second and third PWM generators 21a, 21b, 21c are controlled to generate a carrier offset between each of the first, second and third carrier signals $PWM_{car1}$, $PWM_{car2}$, $PWM_{car3}$, as shown in FIG. 5a, such that the voltage $V_{ph1}$, $V_{ph2}$, $V_{ph3}$ between the node n1, n2, n3 and the ground $GND_{PWR}$ of the respective half-bridges are offset (FIG. 5b) to obtain a variable common mode voltage $V_{CM}$ each time the respective PWM signals $PWM_1$, $PWM_2$, $PWM_3$ are in an off-state.

The carrier offset is preferably generated at all times when the motor is operating although it can be generated, according to an embodiment, only when the current $I_1$, $I_2$, $I_3$ in respective load phase is crossing zero, i.e. when the current is for example between +/−10 mA.

Figure 5C:
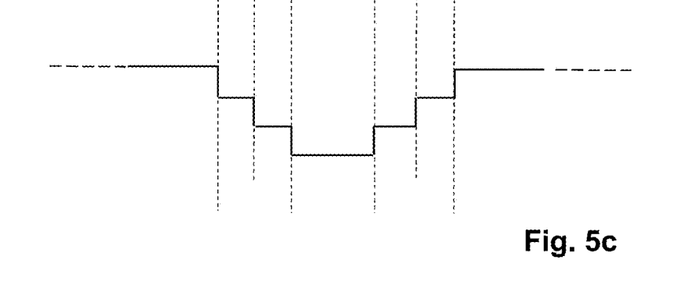
FIG. 5c shows the resulting common mode voltage of the AC motor.

The carrier offset may be for example between 0.4 and 8 µs, preferably around 2 µs in order to obtain the shifted square waves voltages $V_{ph1}$, $V_{ph2}$, $V_{ph3}$. The carrier offset is typically determined according to the selected deadtime, for example between 2 and 6 times the deadtime, preferably around 4 times the deadtime. The resulting common voltage $V_{CM}$ resembles a staircase-shaped ramp voltage as shown in FIG. 5c.

Figure 4B:
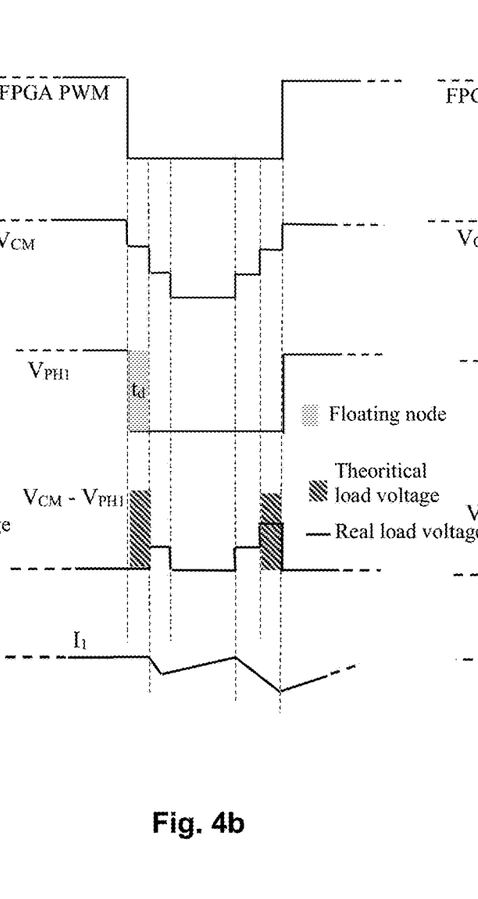
FIG. 4b shows a similar view of FIG. 4a for a scenario in which a zero-crossing compensation algorithm is used according to an exemplary embodiment of the invention.

Referring now to FIG. 4b, at the falling edge of the phase voltage Vo1, the current $I_1$ is still zero. However, as the common mode voltage $V_{cm}$ is no longer the same as the phase voltage $V_{ph1}$, a current pulse is generated on the motor load, reducing the error.

Figure 4C:
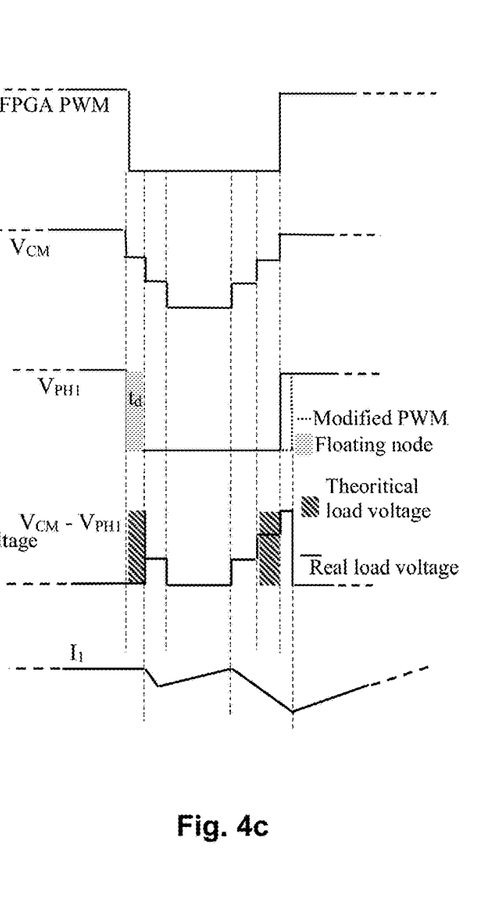
FIG. 4c shows a similar view of FIG. 4b for a scenario in which a zero-crossing compensation algorithm is used together with a deadtime compensation algorithm based on FIGS. 3a and 3b according to an exemplary embodiment of the invention.

In a preferred embodiment, both the deadtime compensation PWM scheme as previously described, and the zero-crossing compensation are applied to further reduce the error when the current is crossing zero as shown in FIG. 4c. In FIGS. 4a to 4c, the theoretical load voltage, which would be obtained without the deadtime negative effect, is shown versus the real load voltage obtained due to the floating node induced by the deadtimes.

Figure 6A:
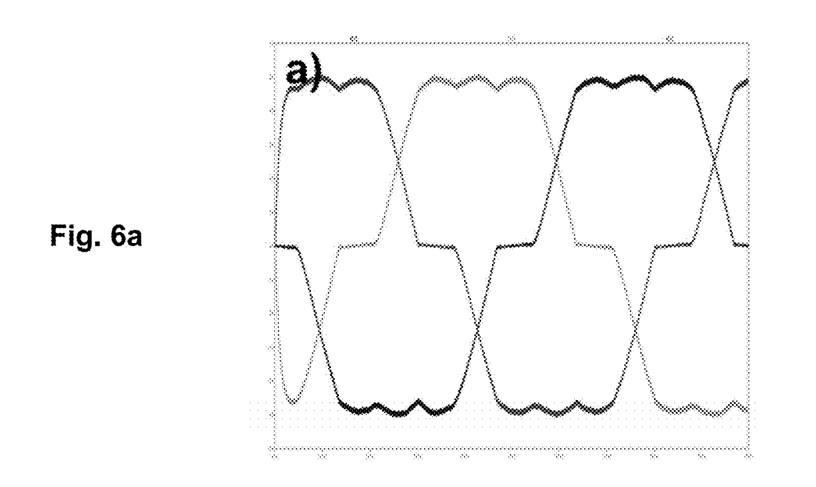
FIG. 6a shows a graph of the current curves measured on each inductive load of a three-phase electric motor with no deadtime and zero-crossing algorithm compensation.
Figure 6B:
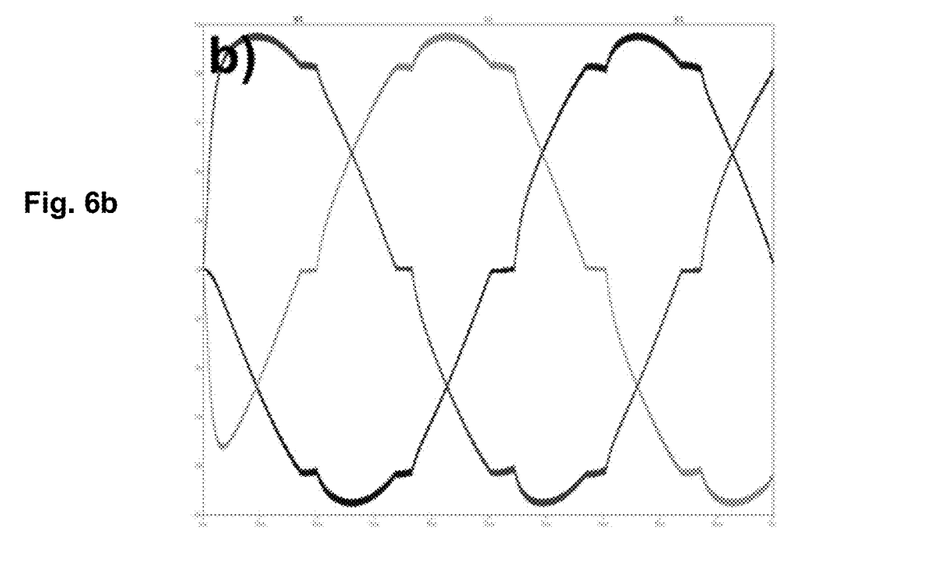
FIG. 6b shows a similar graph of FIG. 6a when a deadtime compensation algorithm is used according to the exemplary embodiment shown in FIG. 4b.
Figure 6C:
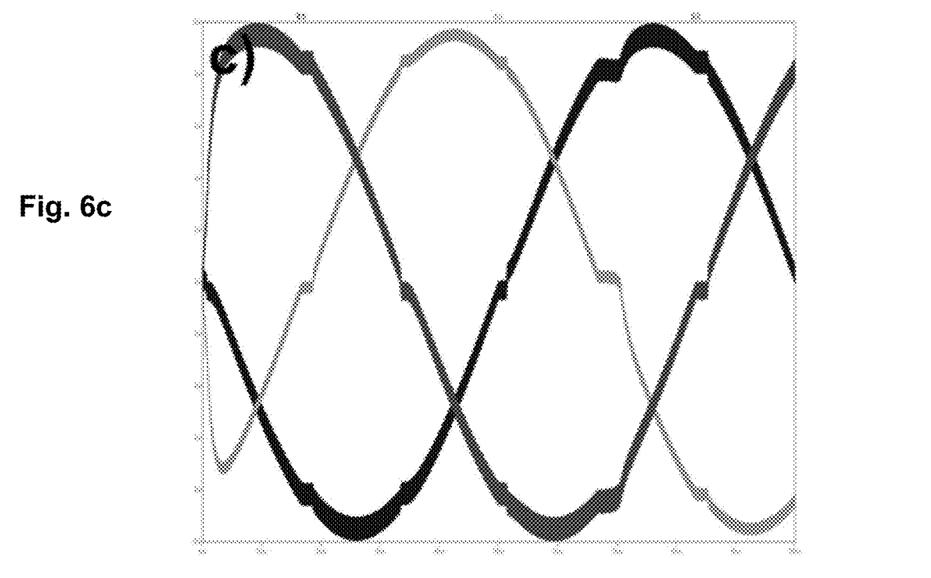
FIG. 6c shows a similar graph of FIG. 6b when a deadtime compensation algorithm is used together with the zero-crossing compensation algorithm according to an exemplary embodiment shown in FIG. 4c.

The deadtime and the zero-crossing compensations significantly reduce the unwanted current-wave distortions of the driving current of the motor as shown in FIGS. 6a to 6c. FIG. 6b shows that the current curves measured on each inductive load of the AC motor when using the deadtime compensation algorithm alone have significant less current-wave distortions when compared to corresponding current curves when no deadtime compensation is performed. FIG. 6c shows that the current curves measured on each inductive load of the AC motor when using the deadtime compensation algorithm together with the zero-crossing compensation algorithm have even less current-wave distortions when compared to the corresponding curves of FIG. 6b where only the deadtime compensation algorithm is used.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

What is claimed is:

1. A pulse width-modulated (PWM) driving method for a PWM motor control system with zero-crossing compensation, wherein the PWM motor control system comprises a three-phase alternating current (AC) motor, a power inverter comprising a first, a second and a third half-bridge, each half-bridge comprising a first transistor connected to a common given voltage and a second transistor connected to a reference point, each phase of the AC motor being connected to respective nodes of a corresponding half-bridge, and a controller comprising a first, a second and a third PWM generator respectively comprising a first, a second and a third carrier generator respectively configured to generate a first, a second and a third carrier signal respectively for generating a first, a second and a third PWM signal, each PWM generator further comprising a deadtime generator configured to transform the respective PWM signal into a first and a second inverted square wave signal with deadtimes to control respectively the first and second transistors of the respective half-bridges, the method comprising:

controlling each carrier generator of the respective first, second and third PWM generators to generate a carrier offset between each of the first, second and third carrier signals, at least when a current flowing in the respective phase of the AC motor is between +/−10 mA, such that a voltage between the respective nodes and the reference point of the respective half-bridges are offset to obtain a variable common mode voltage each time the respective PWM signals are in an off-state, at least when the respective current is crossing zero.

2. The PWM driving method according to claim 1, wherein the carrier offset is generated at all times.

3. The PWM driving method according to claim 1, wherein the carrier offset is constant between each of the carrier signals.

4. The PWM driving method according to claim 3, wherein the carrier offset is between 0.4 and 8 µs.

5. The PWM driving method according to claim 3, wherein the carrier offset is around 2 µs.

6. The PWM driving method according to claim 1, wherein the frequency of each carrier signal is between 5 kHz and 200 kHz.

7. The PWM driving method according to claim 6, wherein the frequency of each carrier signal is around 20 kHz.

8. The PWM driving method according to claim 1, wherein the variable common mode voltage is a staircase-shaped ramp voltage.

9. The PWM driving method according to claim 8, wherein the staircase-shaped ramp voltage comprises a negative ramp slope and a positive ramp slope.

10. The PWM driving method according to claim 1, further comprising:

determining a current sign of the respective current for each phase load of the three-phase AC motor, and wherein a first and a second square wave control signal to control respectively the first and second transistors of the respective half-bridges are computed as follows:

when the current sign of the respective current in the respective load phase of the three-phase AC motor is positive, falling and rising edges of the first control signal are each offset by a first deadtime with respect to corresponding falling and rising edges of the corresponding PWM signal to control the first transistor of the respective half-bridges, while rising edges of the second control signal are offset by a second dead-time with respect to corresponding falling edges of the corresponding PWM signal, the second deadtime being longer than the first deadtime, and falling edges of the second control signal being not offset with respect to corresponding rising edges of the corresponding PWM signal in order to control the second transistor of the respective half-bridges, and when the current sign of the respective current in the respective load phase of the three-phase AC motor is negative, the falling edges of the first control signal are not offset with respect to the corresponding falling edges of the corresponding PWM signal, and the rising edges of the first control signal are offset, with respect to the corresponding rising edges of the corresponding PWM signal, by the second deadtime, while the rising and falling edges of the second control signal are each offset, with respect to the corresponding falling edges and rising edges of the corresponding PWM signal, by the first deadtime which is shorter than the second deadtime.

11. The PWM driving method according to claim 10, wherein the second deadtime is two times longer than the first deadtime.

12. The PWM driving method according to claim 10, wherein the second control signal, to control the second transistor of respective half-bridges, is an inverted delayed replica of the first, second and third PWM signals respectively when the current sign of the current in the respective load phase of the three-phase AC motor is negative, and wherein the first control signal, to control the first transistor of respective half-bridges, is a delayed replica of first, second and third PWM signals respectively when the current sign of the current in the respective load phase of the three-phase AC motor is positive.

13. The PWM driving method according to claim 10, wherein a node voltage of the respective half-bridges of the power inverter is a delayed replica of the first, second and third PWM signals respectively when the current sign of the current in the respective phase load of the three-phase AC motor is positive or negative.

* * * * *